United States Patent
Mattellini

(10) Patent No.: US 7,363,011 B2
(45) Date of Patent: Apr. 22, 2008

(54) METHOD AND APPARATUS FOR ESTIMATING THE IMPULSE RESPONSE OF A RADIO CHANNEL BASED ON A CALCULATED CORRELATION SEQUENCE

(75) Inventor: Gian Paolo Mattellini, Helsinki (FI)

(73) Assignee: Nokia Corporation, Espoo (FI)

( * ) Notice: Subject to any disclaimer, the term of this patent is extended or adjusted under 35 U.S.C. 154(b) by 577 days.

(21) Appl. No.: 10/698,341

(22) Filed: Oct. 31, 2003

(65) Prior Publication Data

US 2004/0121734 A1    Jun. 24, 2004

Related U.S. Application Data

(60) Provisional application No. 60/423,851, filed on Nov. 5, 2002.

(51) Int. Cl.
*H04B 17/00* (2006.01)
(52) U.S. Cl. ............... 455/67.13; 455/67.11; 455/63.1; 455/226.1; 455/296; 375/229; 375/340; 375/343; 375/346
(58) Field of Classification Search ............... 455/63.1, 455/67.11, 13, 67.14–16, 68–69, 561, 562.1, 455/501, 504, 226.1–3, 278.1, 114.1–2, 115.1–3, 455/295–296; 375/229–235, 340–350
See application file for complete search history.

(56) References Cited

U.S. PATENT DOCUMENTS

| | | | | |
|---|---|---|---|---|
| 5,949,794 A | * | 9/1999 | Chiodini | 370/503 |
| 6,002,716 A | * | 12/1999 | Meyer et al. | 375/231 |
| 6,144,709 A | * | 11/2000 | Piirainen et al. | 375/343 |
| 6,259,919 B1 | * | 7/2001 | Suonvieri et al. | 455/441 |
| 6,289,005 B1 | * | 9/2001 | Katz | 370/328 |
| 6,301,470 B1 | * | 10/2001 | Brunner et al. | 455/278.1 |
| 6,321,066 B1 | * | 11/2001 | Katz et al. | 455/25 |
| 6,473,594 B1 | * | 10/2002 | Piirainen | 455/63.1 |
| 6,738,375 B1 | * | 5/2004 | Okanoue | 370/389 |

FOREIGN PATENT DOCUMENTS

| EP | 0701 334 A2 | 8/1994 |
|---|---|---|
| EP | 0701334 | * 3/1996 |

* cited by examiner

*Primary Examiner*—Tuan Tran
(74) *Attorney, Agent, or Firm*—Ware, Fressola, Van Der Sluys & Adolphson LLP

(57) ABSTRACT

A method and a correspondingly operative radio receiver (10) (in either user equipment or a base transceiver station of a cellular telecommunication system) by which the radio receiver (10), in receiving signals transmitted over a radio channel, estimates the impulse response of the radio channel (so as to account for changing conditions of the radio channel) based on a received training sequence (Y) included in the received signal and corresponding to a transmitted training sequence (X), the method including a symbol averaging process (101) by which in effect, by using a calculated correlation sequence ($Y_c''$), two sets of correlations are performed (i.e. a so-called double correlation) without actually performing two sets of correlations, and so improving the estimate of the channel impulse response to the same extent as would result from performing two sets of correlations but with fewer processor operations.

19 Claims, 5 Drawing Sheets

FIG 2
(Prior Art)
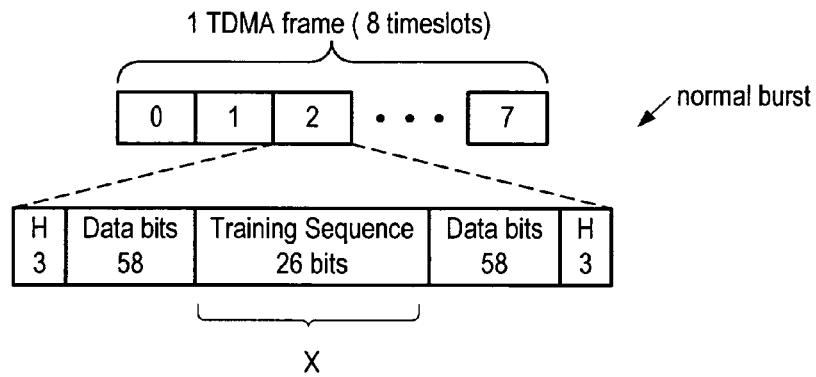
FIG 3
(Prior Art)
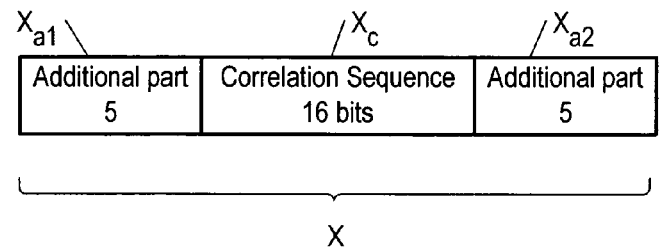
FIG 4
(Prior Art)
| training sequence code | bits in training sequence | | |
|---|---|---|---|
| | additional part | correlation sequence | additional part |
| 0 | 0 0 1 0 0 | 1 0 1 1 1 0 0 0 0 1 0 0 0 1 0 0 | 1 0 1 1 1 |
| 1 | 0 0 1 0 1 | 1 0 1 1 1 0 1 1 1 1 0 0 0 1 0 1 | 1 0 1 1 1 |
| 2 | 0 1 0 0 0 | 0 1 1 1 0 1 1 1 0 1 0 0 1 0 0 0 | 0 1 1 1 0 |
| 3 | 0 1 0 0 0 | 1 1 1 1 0 1 1 0 1 0 0 0 1 0 0 0 | 1 1 1 1 0 |
| 4 | 0 0 0 1 1 | 0 1 0 1 1 1 0 0 1 0 0 0 0 0 1 1 | 1 1 0 1 1 |
| 5 | 0 1 0 0 1 | 1 1 0 1 0 1 1 0 0 0 0 0 1 0 0 1 | 1 1 0 1 0 |
| 6 | 1 0 1 0 0 | 1 1 1 1 1 0 1 1 0 0 0 1 0 1 0 0 | 1 1 1 1 1 |
| 7 | 1 1 1 0 1 | 1 1 1 0 0 0 1 0 0 1 0 1 1 1 0 1 | 1 1 1 0 0 |
$X_{a1}$  $X_c$  $X_{a2}$

US 7,363,011 B2

METHOD AND APPARATUS FOR ESTIMATING THE IMPULSE RESPONSE OF A RADIO CHANNEL BASED ON A CALCULATED CORRELATION SEQUENCE

CROSS REFERENCE TO RELATED APPLICATION

Reference is made to and priority claimed from U.S. provisional application Ser. No. 60/423,851, filed Nov. 5, 2002, entitled METHOD AND APPARATUS FOR ESTIMATING THE IMPULSE RESPONSE OF A RADIO CHANNEL BASED ON A CALCULATED CORRELATION SEQUENCE.

FIELD OF THE INVENTION

The invention pertains to receiving a radio signal via a distorting radio channel, and more particularly to estimating the impulse response of the distorting radio channel so as to be able to adjust a receiver for receiving the radio signals.

BACKGROUND OF THE INVENTION

As is well known, GSM (Global System for Mobile Communications) uses TDMA (time-division multiple access) in which a radio receiver, such as the radio receiver 10 indicated in FIG. 1A, receives symbols communicated in one or more of the eight time slots of an 8-slot TDMA frame, the symbols being communicated as a radio signal by a radio transmitter (not shown) over a distorting radio channel (also not shown). Distortion occurs for example because of multipath propagation which provides that at any particular time, the radio signal arriving at the receiver potentially includes contributions from the signal transmitted at several different earlier times. In general for a linear radio channel (or, approximately, for any radio channel), if the transmitted radio signal is indicated as s(t) and the received signal as r(t), then, $$r(t)=c(t) \otimes s(t)+n(t), \quad (1)$$

where c(t) is the impulse response of the radio channel, n(t) is the noise in the radio channel, and the operation $\otimes$ indicates convolution.

To account for distortion by the radio channel (or in other words, to account for an impulse response that provides other than an identity mapping of the transmitted to the received symbol sequence), a receiver typically includes an equalizer, which is a module that in effect provides (approximately) a function h(t) that is the inverse (relative to convolution) of the channel impulse response c(t)), so that the transmitted signal s(t) can be recovered from the received signal r(t), i.e. the output ŝ(t) of an equalizer is, $$\hat{s}(t)=h(t) \otimes r(t) \approx s(t). \quad (2)$$

An equalizer is only one way of accounting for distortion caused by the radio channel. Another way is to use a module that implements the so-called Viterbi algorithm (well known in the art), using the (estimated) channel impulse response and the received symbol sequence to arrive at (a best guess as to) the transmitted symbol sequence. The different ways of accounting for (i.e. in effect inverting) the impulse response c(t) of the radio channel are not the subject of the invention; the invention deals only with estimating c(t).

According to the invention and as in the prior art, the channel impulse response c(t) is modeled as a transversal filter, i.e. a tapped delay line, with each tap having a corresponding gain, generally a complex number; this follow from the widely used representation of signal as sequence of samples, $$r_k = \sum_i c_i s_{k-i},$$

where $r_k$, $c_i$, $s_{k-i}$ represent sampled versions of the signals r(t), c(t) and s(t) respectively. In the following, for simplicity, we assume operation at one sample per symbol, with an extension to a different sampling rate straightforward for those skilled in the art. A three-tap transversal filter is shown in FIG. 1B.

The aim of the invention is to estimate the gains $c_i$ of a transversal filter that represents the radio channel impulse response c(t); the number of taps of the transversal filter assumed to represent the radio channel impulse response c(t) is predetermined, based on the average duration of the channel impulse response and a judicious choice between accuracy and computational burden.

Because the radio channel impulse response changes over time (since multipath, among other phenomena, is not constant, especially when either the radio receiver or the radio transmitter participating in a radio communication are mobile), it is necessary to continually re-estimate the radio channel impulse response, i.e. to continually recalculate the gains $c_i$ of a transversal filter assumed to represent the radio channel impulse response c(t). To make such a recalculation possible, in the case of GSM, a burst (the transmission in a time slot), which is 148 symbols long (each symbol representing one bit), includes a training sequence X of twenty-six symbols, i.e. X=[x(0) x(1) x(2) . . . x(25)] that in turn includes a sixteen-symbol correlation sequence $X_c$, i.e. $X_c$=[x(5) x(6) x(7) . . . x(20)], sandwiched between two additional parts $X_{a1}$ $X_{a2}$ each five symbols long, as indicated in FIG. 2 and FIG. 3. ($X_{a1}$=[x(0) x(1) . . . x(4)] and $X_{a2}$=[x(21) x(22) . . . x(25)].) As shown in FIG. 4, the five symbols of the first additional part $X_{a1}$ are the same as the last five symbols of the correlation sequence $X_c$, i.e. x(4) =x(20), x(3)=x(19) . . . x(0)=x(16). Similarly, the five symbols of the second additional part $X_{a2}$ are the same as the first five symbols of the correlation sequence $X_c$. (In the figures, the symbols of a burst are indicated as the corresponding bits.) Generally, the length of the additional part is chosen according to the number of taps of the transversal filter assumed to represent the radio channel impulse response c(t), as will be clear from the description that follows.

Training sequences are used not only in GSM, but also in other digital telecommunications systems and in essentially the same way as described above, i.e. by correlating a local replica with the received training sequence for various relative positions. (In such other systems, the number of bits per symbols is sometimes different than in GSM because different modulation schemes are used, the training sequence length might be different than twenty-six symbols, the correlation length might be different than sixteen symbols and the memory of the channel impulse response (channel length−1) to be estimated and consequently the length of the additional part might be different than five symbols.)

The training sequence transmitted to the receiver detector module 11 (FIG. 1) is typically one of several different training sequences and the receiver detector module 11 is provided with a code indicating the training sequence X being used by the transmitter. We indicate using Y the portion of the received training sequence corresponding to the transmitted training sequence and refer to it as the received training sequence, writing Y=[y(0), y(1), y(2) . . . y(25)], where $$y(k) = \sum_i c_i x(k-i),$$

for $0 \leq k \leq 25$.

Similarly we refer to the portion of the received training sequence corresponding to the transmitted correlation sequence $X_c$ as the received correlation sequence $Y_c$.

To calculate the gains $c_i$, the receiver detector module 11 performs sets of correlations of the received training sequence Y with a replica training sequence $X_0$ (i.e. a copy of the training sequence known to have been transmitted). The detector performs (calculates) correlations of the received training sequence Y with the replica $X_0$ for typically six different relative positions of the replica $X_0$ and the received training sequence Y, as described next; each correlation result yields a value of a corresponding gain $c_i$. For the GSM system, all the gains $c_i$ can be estimated independently from each other because the used correlation sequences $X_c$ included in the transmitted training sequence X (See FIG. 3) have ideal cyclic autocorrelation over a certain correlation lag.

FIG. 5 indicates the correlations performed in a conventional channel impulse estimation (i.e. in a conventional calculation of the $c_i$). To perform the required correlations, a GSM receiver in essence slides the replica correlation sequence $X_{0,c}$ over the received training signal Y one symbol at a time, starting with the received correlation sequence $Y_c$ and the replica correlation sequence $X_{0,c}$ aligned. Thus, a correlation is performed for each of six different positions, each differing by one more symbol relative to the starting position. Each correlation provides the value for a corresponding gain $c_i$ (to within an overall normalization factor) of the transversal filter assumed to represent the channel impulse response c(t), the correlation for the starting position yielding $c_0$ (see FIG. 1B), the next correlation for the next position yielding $c_1$, and so on. Thus, with a five-symbol (first) additional part, a six-tap transversal filter is used to represent the channel impulse response c(t).

To obtain a more accurate determination of the channel impulse response c(t), published European Patent application EP 0 701 334 A2, with Nokia Mobile Phones Ltd. as applicant, teaches a method of so-called double correlation, which makes use of the trailing additional part $X_{a2}$. As indicated in FIG. 6, the double correlation method requires making two sets of correlations. A first set of six correlations is made in which, as in the conventional method, the received correlation sequence $Y_c$ is compared with a sequence consisting of the replica correlation sequence $X_{0,c}$ and the replica first additional part $X_{0,a1}$, starting with the received correlation sequence $Y_c$ aligned with the replica correlation sequence $X_{0,c}$ and then shifting the received correlation sequence $Y_c$ one symbol at a time and repeating the correlation, until a total of six correlations are performed. Next, a second set of six correlations is made in which a different received correlation sequence $Y_c'$ is used, consisting of only a portion $Y_{c2}$ of the received correlation sequence $Y_c$, namely the eleven symbols closest to the second additional part $Y_{a2}$, followed by the five symbols of the received second additional part $Y_{a2}$, as indicated in FIG. 7. It is useful to observe here, in order to understand the idea disclosed in the present invention, that in the absence of noise and under the assumption that the channel impulse response is effectively less than six symbol long, the symbols of the different received correlation sequence $Y_c'$ are the same as the symbols of the received correlation sequence $Y_c$, although in a somewhat different order as indicated in FIG. 7. In the second set of correlations, the different received correlation sequence $Y_c'$ is compared with a sequence consisting of the replica correlation sequence $X_{0,c}$ and the replica second additional part $X_{0,a2}$, starting with the different correlation sequence $Y_c'$ aligned with the replica second additional part $X_{0,a2}$ and then shifting it one symbol at a time and repeating the correlation, until a total of six correlations are performed. The results of the two sets of correlations (i.e. the gains $c_i$) are then averaged (i.e. each correlation from the first set is averaged with the corresponding correlation in the second set).

The double correlation method thus requires twice as many correlations as the conventional method, and each correlation requires a relatively large number of arithmetic and logical operations by a processor. It would be advantageous to be able to somehow arrive at the same improved result achieved by the double correlation method but with substantially fewer processor operations than are required by the double correlation method.

SUMMARY OF THE INVENTION

Accordingly, in a first aspect of the invention, a method is provided by which a radio receiver, in receiving a signal transmitted over a radio channel, estimates the impulse response of the radio channel based on a received training sequence included in the received signal, the method including a step of performing a plurality of correlations of a correlation sequence derived from the received training sequence with a replica of the transmitted correlation sequence, characterized by a step 1) of calculating the received correlation sequence derived from the received signal based on averaging symbols of the received training sequence.

In a second aspect of the invention, a method is provided for estimating the impulse response of a radio channel by which a radio receiver receives a received signal including a received training sequence for which the radio receiver knows a corresponding replica training sequence, the received training sequence including a correlation sequence having a first end and a second and, and also including an additional part at the second end, with the additional part the same as a corresponding portion of the correlation sequence at the first end of the received correlation sequence, and likewise for the replica training sequence so that it includes a replica correlation sequence, the method characterized by: a sequence-calculating step, responsive to the received training sequence, of forming a calculated correlation sequence by averaging a predetermined number of symbols from the first end of the received correlation sequence with a predetermined number of corresponding symbols from the additional part at the second end of the received training sequence; and a correlating step, responsive to the calculated correlation sequence, of performing a set of correlations of the calculated correlation sequence with the replica training sequence, the set of correlations including a first correlation in which the calculated correlation sequence is aligned with the replica correlation sequence and including subsequent correlations performed with the calculated correlation sequence shifted for each next correlation by one or more symbols from the position in the immediately preceding correlation, so as to provide information useful in estimating the channel impulse response.

In a third aspect of the invention, a receiver is provided, characterized in that it is operative according to either the first or second aspect of the invention.

In a fourth aspect of the invention, a telecommunication system is provided, including a base transceiver station and a user equipment, both of which include a receiver, characterized in that both receivers are operative according to either the first or second aspect of the invention.

In a fifth aspect of the invention, a computer program product is provided comprising: a computer readable storage structure embodying computer program code thereon for execution by a computer processor in a receiver, with said computer program code characterized in that it includes instructions for performing steps of a method according to either the first or second aspect of the invention.

BRIEF DESCRIPTION OF THE DRAWINGS

The above and other objects, features and advantages of the invention will become apparent from a consideration of the subsequent detailed description presented in connection with accompanying drawings, in which:

FIG. 2 is a schematic illustrating the frame structure of a frame used in time division multiple access (TDMA) by some cellular telecommunication systems (such as GSM), and also showing the composition of a so-called normal burst (the transmission in one time slot of a TDMA frame), including a training sequence.

FIG. 3 is a schematic illustrating the composition of a training sequence.

FIG. 4 is a table showing the bits (corresponding to symbols of the training sequence via a mapping such as a mapping in which bit value 1 corresponds to symbol value 1 or some other symbol value, and bit value 0 corresponds to symbol value −1 or some other symbol value different from the value corresponding to bit value 1) in each of the eight different training sequences used in GSM.

BEST MODE FOR CARRYING OUT THE INVENTION

The invention is described below making reference in particular to GSM. It should be understood however that the invention can be used in any telecommunication system using TDMA and using training sequences constructed similarly to those used in GSM, i.e. so as to have a correlation sequence and two additional parts, one on either side of the correlation sequence, with the correlation sequence including fragments that are the same as the two additional parts.

Figure 1:
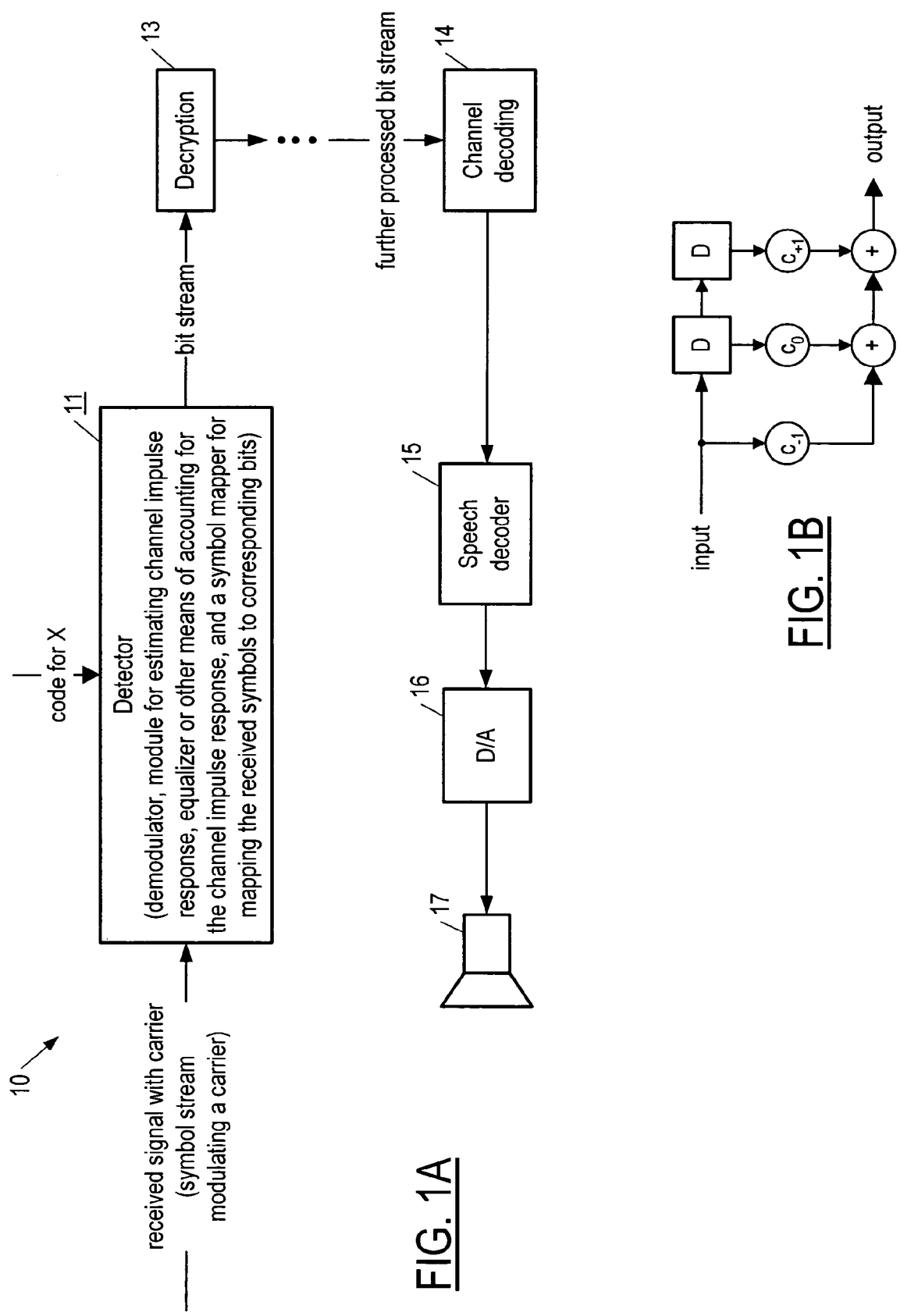
FIG. 1A is a block diagram showing some components of a receiver of a cellular telecommunications device, including a detector implemented to perform the method provided by the invention.
FIG. 1B is a block diagram of a transversal filter (a tapped delay line) assumed to represent the radio channel providing the radio receiver with a received radio signal differing from the transmitted radio signal because of distortion by the radio channel (modeled by having non-zero gains for other than only the first tap of the transversal filter).
Figure 5:
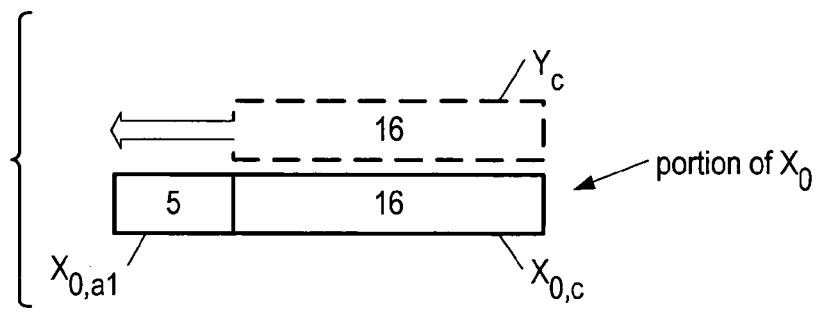
FIG. 5 is a schematic illustrating the correlations performed by the conventional method for using a training sequence (in GSM and some other telecommunication systems).
Figure 6:
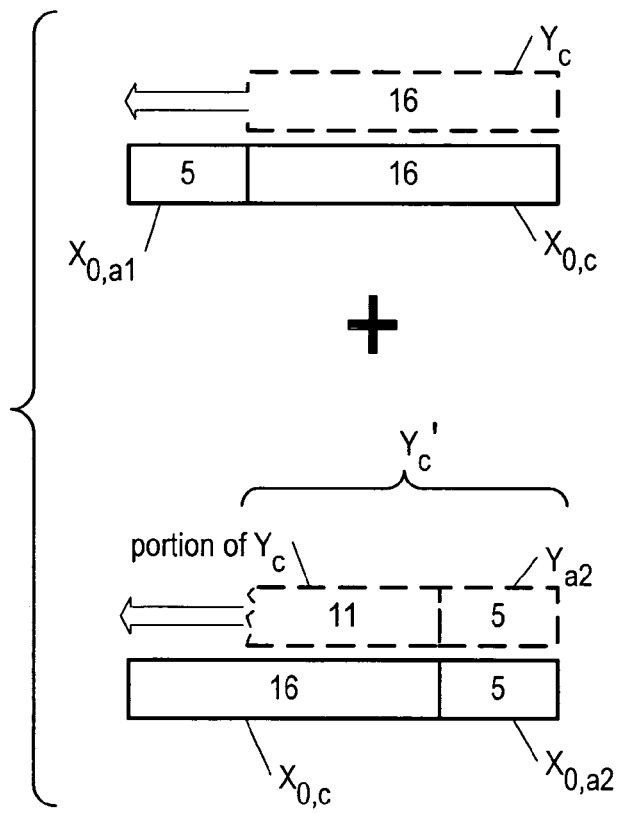
FIG. 6 is a schematic illustrating the correlations performed by the so-called double correlation method of the prior art.

Referring now to FIG. 1, a receiver of a telecommunications system 10 is shown according to the invention as including a detector 11 for demodulating a received signal of a stream of symbols modulating a carrier wave, a module for estimating the channel impulse response c(t) (i.e. for determining gains $c_i$ of a transversal filter representing the channel impulse response c(t)), an equalizer or other means of accounting for the channel impulse response c(t) (such as a module implementing the Viterbi algorithm) and so determining a transmitted symbol sequence corresponding to a received symbol sequence, given the estimate of the channel impulse response c(t), and a symbol mapper for mapping the received symbols to corresponding bits. The received symbol stream is a so-called normal burst (the content of a time slot of a TDMA frame). In at least some of the bursts, a (transmitted) training sequence X is conveyed and received as a received training sequence Y, providing the receiver with a means for estimating the channel impulse response c(t) in terms for example of gains $c_i$ of a transversal filter, as discussed above, by performing correlations of the received training sequence Y with a replica $X_0$ of the transmitted training sequence X (the replica being stored in the detector 11). Since the transmitted training sequence X is only one of various different training sequences available for use, the detector is either provided with a code indicating the particular sequence being used, as shown in FIG. 1, or else determines the training sequence being used by examining the received bit stream. Ultimately, the detector provides a bit stream (only the data bits of the received bit stream) to (typically) a decryption module 13, which, in combination with other modules (not shown), further processes the detected bits, and then a channel decoding module 14 decodes the further processed bit stream (removing the redundancy added to allow error detection and possibly error correction) and a speech decoder 15 and a digital to analog converter 16 process the output of the channel decoding module 14 so as to provide a speech signal to a microphone 17.

The above description refers to voice transmission, but it is to be understood that the invention is also of use in case of data transmission.

Figure 7:
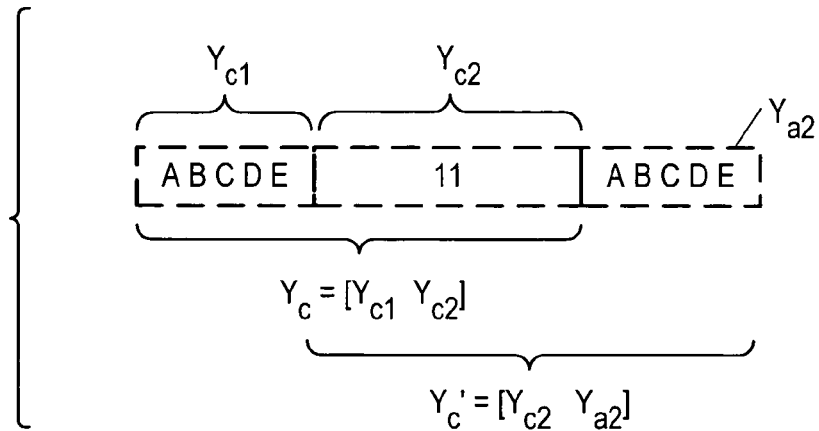
FIG. 7 is a schematic illustrating the composition of the two different correlation sequences $Y_c$ and $Y_c'$ used in the so-called double correlation method of the prior art.
Figure 8:
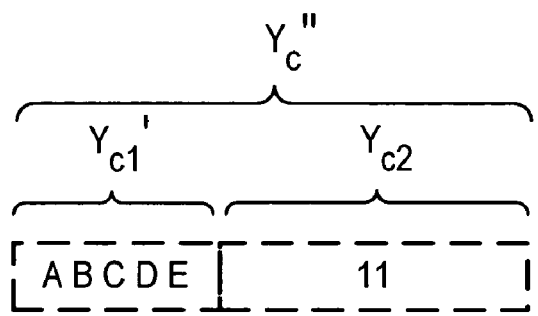
FIG. 8 is a schematic illustrating the composition of the correlation sequence $Y_c''$ used in the invention, which is a calculated correlation sequence.

Referring now to FIG. 8 and also to FIGS. 3 and 7, instead of using either a portion of the received correlation sequence $Y_c$ as in the conventional method, and instead of using a different correlation sequence $Y_c'$ (=$[Y_{c,2}\ Y_{a2}]$, as shown in FIG. 7) used in the double correlation method of the prior art, the invention calculates a received correlation sequence—called here the calculated correlation sequence and indicated by $Y_c''$—so as to include the eleven-symbol portion $Y_{c2}$ (consisting of the eleven symbols closest to the second additional part $Y_{a2}$) of the received correlation sequence concatenated with a five-symbol string $Y_{c1}'$ that is an average of the five symbols $Y_{c1}$ (the five symbols closest to the first additional part $Y_{a1}$ of the received training sequence Y) and the five symbols of the second additional part $Y_{a2}$ of the received training sequence Y. Thus, the calculated correlation sequence $Y_c''$ is given by, $$Y_c''=[(Y_{c1}+Y_{a2})/2 \ Y_{c2}]=[Y_{c1}' \ Y_{c2}],$$

where the square brackets [ ] indicate concatenation of the sequences inside the brackets, i.e. $Y_{c1}'$ and $Y_{c2}$.

As a result of the averaging process used for the first portion of the calculated correlation sequence $Y_c''$, the noise in the calculated correlation sequence is diminished. It will also be evident for those skilled in the art that there are alternative ways to obtain the calculated correlation sequence (correlated by the proper portion of reference training sequence) which would provide the same estimation of the gains $c_i$, as for instance, $$Y_c''_{alternative}=[Y_{c2} \ (Y_{c1}+Y_{a2})/2]=[Y_{c2} \ Y_{c1}'].$$

Figure 9:
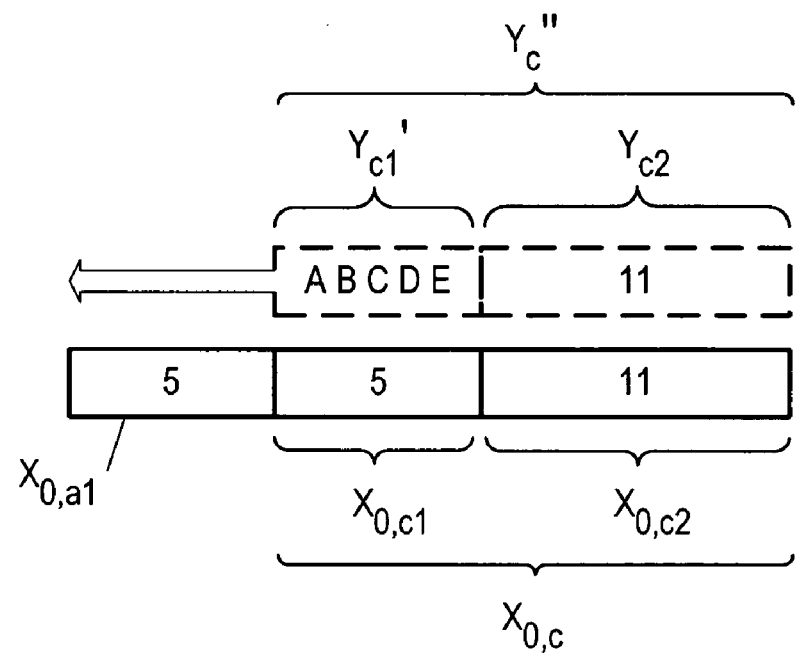
FIG. 9 is a schematic illustrating the correlations performed according to the invention, using the calculated correlation sequence $Y_c''$.

Referring now to FIG. 9, instead of performing two correlations as in the double correlation method of the prior art, the invention performs a single correlation as in the conventional (prior art) method, but uses the calculated correlation sequence $Y_c''$ instead of the received correlation sequence $Y_c$. The result is the same as what is provided by the double correlation method but requires approximately one half the number of processor operations (i.e. approximately the number required to perform one set of six correlations) since the number of processor operations required to provide the calculated correlation sequence $Y_c''$ is substantially less than what would be required in performing a complete additional set of six correlations.

Figure 10:
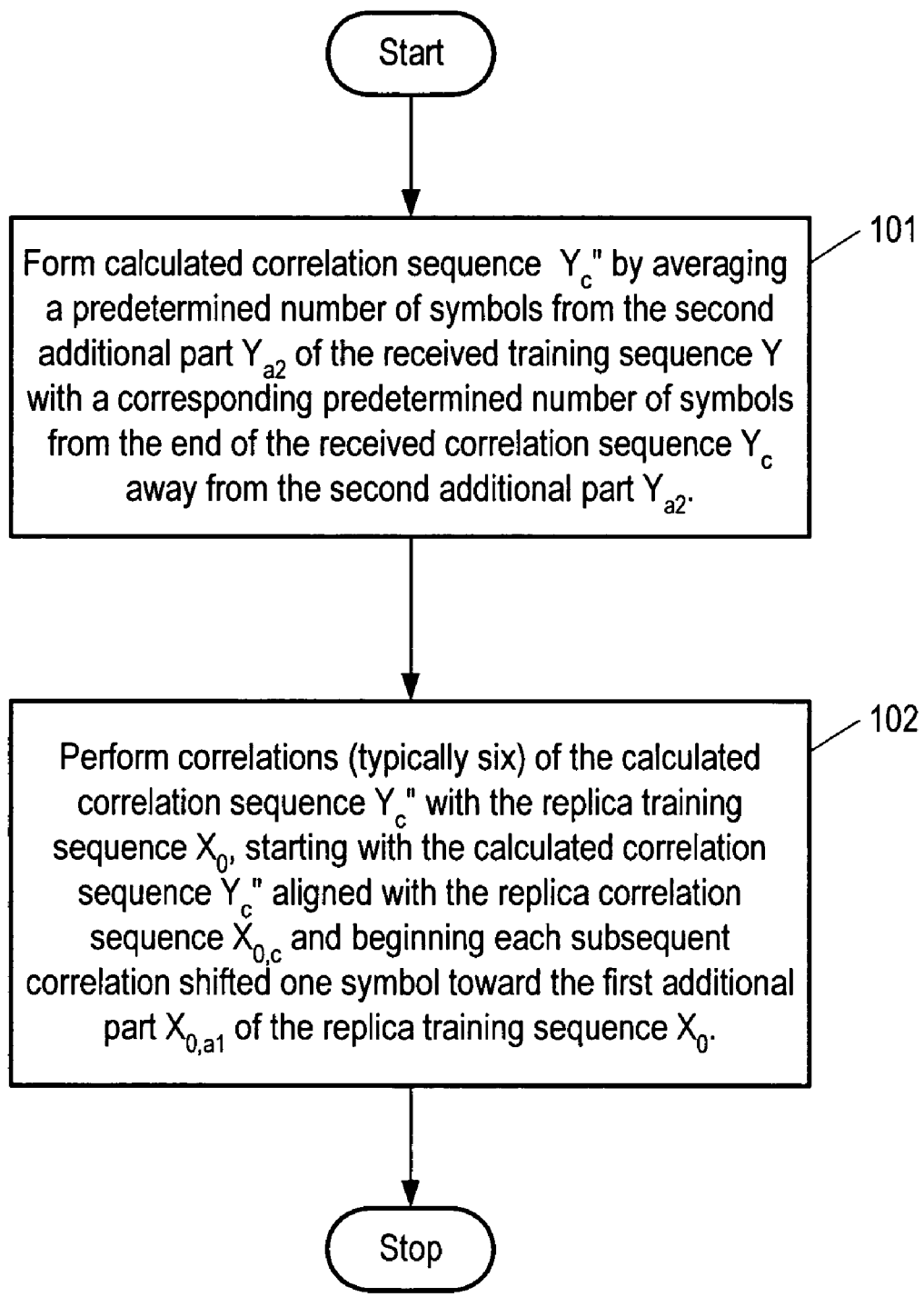
FIG. 10 is a flow chart indicating the method of the invention.

Referring now to FIG. 10, the invention is shown as providing a method including a first step 101 of forming the calculated correlation sequence $Y_c''$ as indicated above, or more generally, by averaging a predetermined number of symbols from the second additional part $Y_{a2}$ of the received training sequence Y with a corresponding predetermined number of symbols from the end of the received correlation sequence $Y_c$ away from the second additional part $Y_{a2}$. Then in a next step 102, the correlations (typically six) are performed as in the conventional method but using the calculated correlation sequence $Y_c''$ in place of the received correlation sequence $Y_c$, i.e. correlations of the calculated correlation sequence $Y_c''$ with the replica training sequence $X_0$ starting with the calculated correlation sequence $Y_c''$ aligned with the replica correlation sequence $X_{0,c}$ and beginning each subsequent correlation shifted one symbol toward the first additional part $X_{0,a1}$ of the replica training sequence $X_0$.

It should be understood that the above described process is also of use in case of a modulation system in which more than one bit is conveyed per symbol.

The invention has been described in terms (primarily) of the steps of a method. The invention also comprehends an apparatus—e.g. the detector 11 (FIG. 1)—for performing the above described steps. For each step described above, there can be a corresponding module of the apparatus, although it is also possible for the functionality for performing more than one of the above-described steps to be incorporated into a single module. Such modules may be implemented as hardware, or may be implemented as software or firmware for execution by a processor. In particular, in the case of firmware or software, the invention is provided as a computer program product including a computer readable storage structure embodying computer program code—i.e. the software or firmware—thereon for execution by a computer processor provided with e.g. the receiver 10 (FIG. 1) of which the apparatus such as the detector 11 (FIG. 1) may be a component.

It is to be understood that the above-described arrangements are only illustrative of the application of the principles of the present invention. In particular, the receiver 10 (FIG. 1) can be the receiver in a mobile station having a radio channel between its antenna and a base station antenna, or it be the receiver in the base station (as already mentioned), or it can be a receiver in a telephone connected via a cable to a remote transceiver with a radio channel between the transceiver antenna and the base station antenna. In addition, the training sequence need not necessarily be in the middle of a burst. Thus e.g. in the digital radiotelephone system used in the United States, a TDMA frame consists of six time slots of 162 symbols each, and a burst transmitted in a time slot from the base station to the mobile station always begins with a synchronization burst of 14 symbols (typically representing 28 bits), which is used as a training sequence. Also, the additional part need not be on both sides of the correlation sequence, as in the GSM system, but instead there could be only one additional part which is either before or after the correlation sequence. Finally, the symbol sequences in the training sequences need not necessarily be the same in both directions (from base station to subscriber, and from subscriber to base station). Numerous modifications and alternative arrangements may be devised by those skilled in the art without departing from the scope of the present invention, and the appended claims are intended to cover such modifications and arrangements.

What is claimed is:

1. A method by which a radio receiver, in receiving a signal transmitted over a radio channel, estimates the impulse response of the radio channel based on a received training sequence included in the received signal, the method comprising calculating a correlation sequence based on averaging symbols of the received training sequence by selecting two portions of the received training sequence of a same length and averaging respective symbols of the two portions of the received training sequence to form an average sequence and adding to the average sequence another portion of the training sequence, and performing a plurality of correlations using the calculated correlation sequence.

2. The method as in claim 1, wherein the two portions are a first portion of a correlation sequence included in the received training sequence and a second portion from a part of the received training sequence additional to the correlation sequence.

3. A method for estimating the impulse response of a radio channel by which a radio receiver receives a received signal including a received training sequence for which the radio receiver knows a corresponding replica training sequence, the received training sequence including a received correlation sequence having a first end and a second end, and also including an additional part at the second end, with the additional part the same as a corresponding portion at the first end of the received correlation sequence, and likewise for the replica training sequence so that it includes a replica correlation sequence, the method comprising:

a) calculating a correlation sequence using the received training sequence, by averaging a predetermined number of symbols from the first end of the received correlation sequence with a predetermined number of corresponding symbols from the additional part at the second end of the received training sequence; and b) performing a set of correlations of the calculated correlation sequence with the replica training sequence, the set of correlations including a first correlation in which the calculated correlation sequence is aligned with the replica correlation sequence and including subsequent correlations performed with the calculated correlation sequence shifted for each next correlation by one or more symbols from the position in the immediately preceding correlation, so as to provide information useful in estimating the channel impulse response.

4. A receiver, operative according to the method of claim 1.

5. A receiver, operative according to the method of claim 3.

6. A telecommunication system, including a base transceiver station and a user equipment, both of which include receivers, wherein both receivers are operative according to the method of claim 1.

7. A telecommunication system, including a base transceiver station and a user equipment, both of which include receivers, wherein both receivers are operative according to the method of claim 3.

8. A computer program product comprising: a computer readable storage structure embodying computer program code thereon for execution by a computer processor in a receiver, wherein said computer program code includes instructions for performing a method according to claim 1.

9. A computer program product comprising: a computer readable storage structure embodying computer program code thereon for execution by a computer processor in a receiver, wherein said computer program code includes instructions for performing a method according to claim 3.

10. An apparatus, comprising a processor, configured to:
calculate a correlation sequence based on averaging symbols of a received training sequence resulting from a transmitted training sequence by selecting two portions of the received training sequence of a same length and averaging respective symbols of the two portions of the received training sequence to form an average sequence and adding to the average sequence another portion of the training sequence; and
perform a plurality of correlations using the calculated correlation sequence.

11. The apparatus as in claim 10, wherein the received training sequence includes a received correlation sequence having a first end and a second end, and also includes an additional part at the second end, with the additional part the same as a corresponding portion at the first end of the received correlation sequence, wherein the processor is configured to calculate the correlation sequence by averaging a predetermined number of symbols from the first end of the received correlation sequence with a predetermined number of corresponding symbols from the additional part at the second end of the received training sequence.

12. The apparatus as in claim 11, wherein for performing the plurality of correlations using the calculated correlation sequence, the processor is configured to perform a set of correlations of the calculated correlation sequence with a replica of the transmitted training sequence, with the set of correlations including a first correlation in which the calculated correlation sequence is aligned with the replica correlation sequence and including subsequent correlations performed with the calculated correlation sequence shifted for each next correlation by one or more symbols from the position in the immediately preceding correlation.

13. The apparatus as in claim 10, wherein the two portions are a first portion of a correlation sequence included in the received training sequence and a second portion from a part of the received training sequence additional to the correlation sequence.

14. A mobile station, comprising an apparatus as in claim 10, and a receiver for receiving the transmitted training sequence.

15. A telecommunication system, including a base transceiver station and a mobile station, with wherein both the base transceiver station and the mobile station include apparatuses as in claim 10.

16. An apparatus, comprising:
means for calculating a correlation sequence based on averaging symbols of a received training sequence resulting from a transmitted training sequence by selecting two portions of the received training sequence of a same length and averaging respective symbols of the two portions of the received training sequence to form an average sequence and adding to the average sequence another portion of the training sequence; and
means for performing a plurality of correlations using the calculated correlation sequence.

17. The apparatus as in claim 16, wherein the received training sequence includes a received correlation sequence having a first end and a second end, and also includes an additional part at the second end, with the additional part the same as a corresponding portion at the first end of the received correlation sequence, wherein the means for calculating the correlation sequence is configured to average a predetermined number of symbols from the first end of the received correlation sequence with a predetermined number of corresponding symbols from the additional part at the second end of the received training sequence.

18. The apparatus as in claim 17, wherein the means for performing a plurality of correlations is configured to perform a set of correlations of the calculated correlation sequence with a replica of the transmitted training sequence, with the set of correlations including a first correlation in which the calculated correlation sequence is aligned with the replica correlation sequence and including subsequent correlations performed with the calculated correlation sequence shifted for each next correlation by one or more symbols from the position in the immediately preceding correlation.

19. The apparatus as in claim 16, wherein the two portions are a first portion of a correlation sequence included in the received training sequence and a second portion from a part of the received training sequence additional to the correlation sequence.

* * * * *